A. H. Tait.
Manufacture of Sulphuric Acid.

N° 86,881. Patented Feb. 9, 1869.

Witnesses:
Ernest F. Kasten Luber
C. Wahlers

Inventor:
A. H. Tait
Per Van Santvoord & Hauff, Attys

A. H. TAIT, OF NEW YORK, N. Y.

Letters Patent No. 86,881, dated February 9, 1869.

IMPROVEMENT IN THE MANUFACTURE OF SULPHURIC ACID.

The Schedule referred to in these Letters Patent and making part of the same.

*To all whom it may concern:*

Be it known that I, A. H. TAIT, of the city, county, and State of New York, have invented a new and useful Improvement in the Manufacture of Sulphuric Acid; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
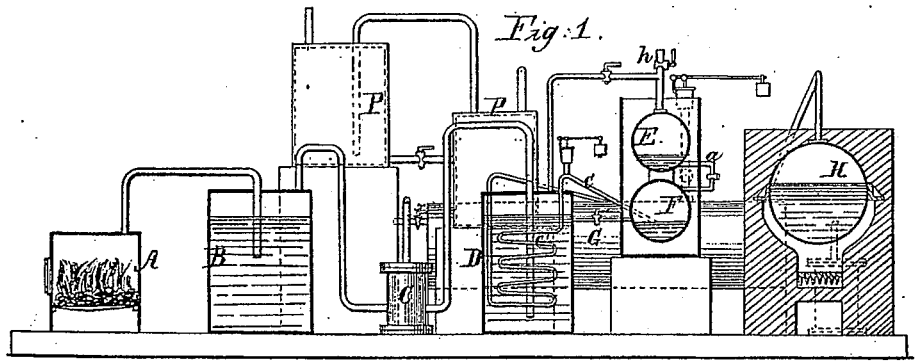
Figure 1 represents a sectional side elevation of the apparatus, which I have used in carrying out my invention.
Figure 2:
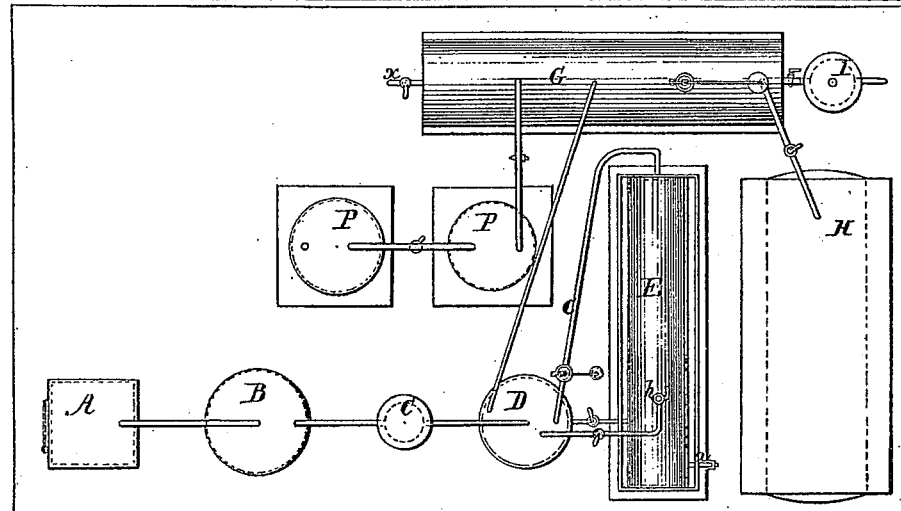
Figure 2 is a plan or top view thereof.
Figure 3:
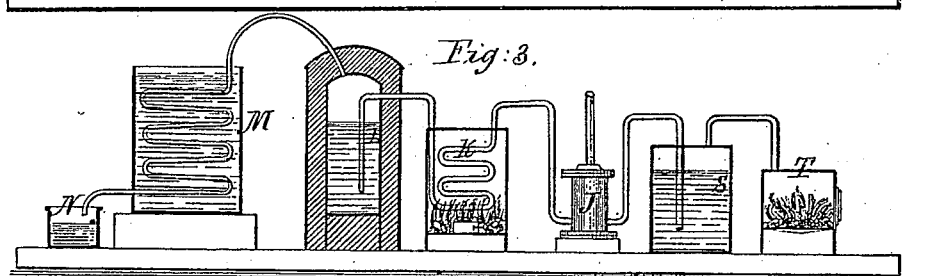
Figure 3 is a longitudinal vertical section of the concentrator.
Figure 4:
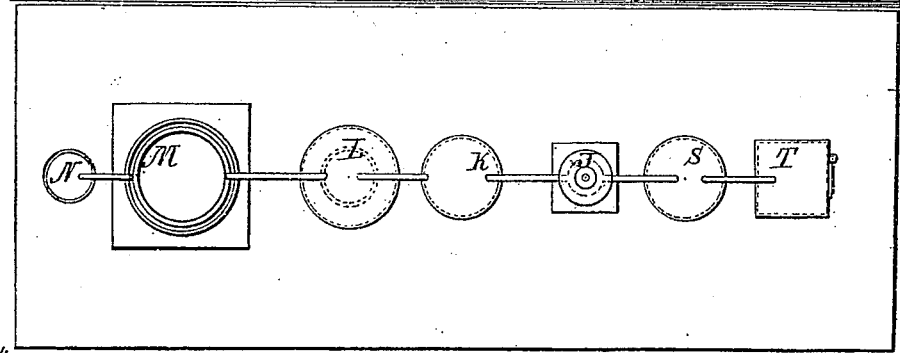
Figure 4 is a plan or top view of the same.

This invention is based on the discovery that sulphurous acid, ($SO_2$,) when compressed into a fluid state and brought in contact with nitrous acid, ($NO_3$,) also compressed into a fluid state in the presence of oxygen and steam, will produce sulphuric acid ($SO_3$) much more readily and quickly than it does when brought in contact with nitrous acid in a gaseous state, as usually practised in the manufacture of sulphuric acid; and, furthermore, by using the sulphurous acid in a fluid state, or under pressure, I am enabled to separate the nitrogen of the atmospheric air from it in a simple and efficient manner, and the loss of nitrogen-gases is materially reduced, or almost entirely prevented.

The apparatus which I use in carrying out my invention consists of a furnace, A, for the purpose of producing sulphurous-acid gas by burning sulphur or pyrites.

The gases evolved in the furnace A are passed into the first washer, B, for the purpose of separating the atmospheric impurities, and from this washer said gases are removed by the action of the pump C, which serves to force the same into the second washer, D, and through this washer into the vessel E, in which the gases are subjected to a pressure of forty-five pounds per square inch, so that the sulphurous acid becomes fluid.

The lower part of the vessel E connects, by a pipe and cock, $a$, with the vessel F, in which the fluid sulphurous acid is collected.

In the upper portion of the vessel E is a cock, $h$, and when the pressure in this vessel has reached the desired point for the compression of the sulphurous acid, said cock is opened gently, while the cock $a$ is closed, and the nitrogen-gas which is mixed with the sulphurous gas evolved from the furnace A, is let off, while the fluid sulphurous acid is let down into the vessel F.

When a sufficient quantity of fluid sulphurous acid has collected in the vessel F, the pipe $c$ is opened, which extends from the bottom part of said vessel to the coil $c'$, situated in the washer D, and the fluid sulphurous acid, being relieved of the pressure, expands and cools the liquid contained in the washer D, whereby the separation of the impurities, particularly the arsenic mixed with the sulphurous acid, when pyrites are burned in the furnace A, is materially facilitated.

The sulphurous-acid gas escaping from the coil $c'$, and being freed from nitrogen, and other impurities, is conducted into the chamber G, which is supplied with nitric-oxide vapors, through a pipe, $x$, with steam from the boiler H, and with atmospheric air, or with pure oxygen, by means of a force-pump, I, which, when pure oxygen is used, also serves to produce the required pressure in said chamber, so that the sulphurous-acid gas will become fluid.

The nitrous oxide, ($NO_2$,) on coming in contact with oxygen, in the presence of steam or moisture, readily takes up another equivalent of oxygen, and forms nitrous acid, ($NO_3$,) which, at the pressure existing in the chamber G, becomes fluid, and mingles with the fluid sulphurous acid, but as soon as these two fluids come in contact, the nitrous acid parts with a portion of its oxygen, which combines with an equivalent portion of the sulphurous acid, and forms sulphuric acid, while the nitrous acid is thereby reconverted into nitrous oxide, which, being non-condensable by pressure, rises in the gaseous form, takes up another quantity of oxygen, forming again fluid nitrous acid, and so forth, until all the sulphurous acid in the chamber has been converted into sulphuric acid.

If, instead of pure oxygen, ordinary atmospheric air is introduced into the chamber G, the pressure in said chamber is not kept up to a point sufficient to liquefy the sulphurous acid, but only to about four to ten pounds per square inch, sufficient to facilitate the union of the gases, and pass off the nitrogen of the air, and a portion of the nitrous acid through the receivers P P, where the latter is recovered and returned to the chamber.

The connection between the chamber and receivers is effected by a pipe, or chimney, which is provided with a valve, loaded to the required pressure, but when pure oxygen is used in the chamber G, said chimney is not required.

In either case, however, whether atmospheric air or pure oxygen is introduced in the chamber, the sulphurous acid is entirely freed from the nitrogen mixed therewith, when it escapes from the furnace, by the action of the vessels E F and pump C, as previously described, and since the nitrogen, if not separated from the sulphurous acid, takes up nearly four-fifths of the space of the chamber, and furthermore, when it passes off by the chimney, to make room for a fresh supply of atmospheric air to carry on the process, it takes with it a large portion of sulphurous acid and nitric vapors which are wasted and lost, my process offers no small advantage over the old process.

The sulphuric acid formed in the chamber G is concentrated by means of hot air, as follows:

A pump, J, is provided, which serves to force a current of air through a coil, K, enclosed in a suitable heater, so that said air, while passing through the coil, is raised to a high temperature. The heated air is then passed into a vessel, L, loaded to about three-fourths of its capacity with chamber-acid. This vessel is composed of metal, lined with vitrified tiles, and the heated air is conducted through a plated platinum pipe, passing nearly to its bottom. The heated air, in passing through the acid, carries with it a sufficient quantity of water to raise the gravity of the acid quickly to $66\frac{1}{2}°$ Baumé.

A furnace, T, supplies a fresh quantity of sulphurous acid, which is washed in the vessel S, and then passed, with the heated air, through the chamber-acid in the vessel L, so that all traces of nitric acid drawn off from the chamber are got rid of.

The acid contained in the air passing off from the vessel L is condensed in a coil situated in a cooling-vessel, M, and it collects in the receiver N.

Having thus described my invention,

What I claim as new, and desire to secure by Letters Patent, is—

1. The within-described process of freeing sulphurous acid from nitrogen, previous to introducing the same into the chamber, by liquefying the sulphuric acid in a vessel provided with a safety-valve, or blow-off cock, substantially as set forth.

2. The within-described process of freeing sulphurous acid from arsenic, by passing the sulphurous-acid vapors through a refrigerator, D, as specified.

3. Impelling or freeing the sulphurous acid in its passage through the apparatus, by means of a pump or other equivalent mechanism, as set forth.

4. Exposing sulphurous-acid gas to the action of nitric oxide, atmospheric air, and steam, under pressure, as set forth.

5. Exposing the sulphurous acid in a fluid state to the action of nitric oxide, oxygen, and steam, substantially in the manner herein described.

6. Passing a current of heated air through the chamber-acid, substantially as and for the purpose set forth.

7. Injecting with the heated air a current of sulphurous acid into the vessel, partially filled with the chamber-acid, substantially as and for the purpose described.

A. H. TAIT.

Witnesses:
W. HAUFF,
ERNEST F. KASTENHUBER.